June 28, 1966 W. J. PENDERGAST 3,258,413
METHOD FOR THE FABRICATION OF TANTALUM FILM RESISTORS
Original Filed Dec. 20, 1961 2 Sheets-Sheet 1

INVENTOR
W. J. PENDERGAST
BY
Edward M. Fink
ATTORNEY

METHOD FOR THE FABRICATION OF TANTALUM FILM RESISTORS

Original Filed Dec. 20, 1961 2 Sheets-Sheet 2

United States Patent Office 3,258,413

Patented June 28, 1966

3,258,413
METHOD FOR THE FABRICATION OF TANTALUM FILM RESISTORS

Warren J. Pendergast, Gillette, N.J., assignor to Bell Telephone Laboratories, Incorporated, New York, N.Y., a corporation of New York Original application Dec. 20, 1961, Ser. No. 160,769. Divided and this application July 30, 1965, Ser. No. 476,127

4 Claims. (Cl. 204—192)

This application is a division of copending application, Serial No. 160,769, filed Dec. 20, 1961, now abandoned.

This invention relates to a method for the fabrication of tantalum film resistors, and to the resistors so produced.

In recent years, the miniaturization of components and circuitry has been a major development activity in the electronics industry. Particular emphasis has been placed upon the development of a thin film material, suitable for resistor purposes, which evidences the combined properties of high specific resistivity, a low temperature coefficient of resistance and high thermal stability.

Among the more promising materials developed thus far have been sputtered films of tantalum which typically evidence resistivity values of 250±50 micro ohm-cm., sheet resistance values of the order of 100 ohms/square, temperature coefficients of resistance of approximately ±100 p.p.m./° C. and thermal stabilities of ±2 percent change in resistance after 1000 hours at 100° C. Although such tantalum components are widely used and satisfactory for most device purposes, the need has developed for a technique of fabricating a resistor film material which evidences appreciably higher resistivity and stability than heretofore attained while maintaining effective temperature coefficients.

In accordance with this invention, a technique is described for preparing tantalum film resistors by successively depositing a thin layer of tantalum on a suitable substrate by reactive sputtering in an atmosphere of oxygen, anodizing the deposited film and heating the film in air.

The inventive technique described herein results in a product evidencing specific resistivities of the order of 1000 micro ohm-cm. and higher, sheet resistance values of approximately 1000 ohms/square and temperature coefficients of resistance within the range of —200 to —300 p.p.m./° C. These desirable properties are achieved with an unusual increase in thermal stability, amounting to less than 0.1 percent change in resistance after 1000 hours at 150° C. Furthermore, in isolated instances were high resistivities are of major importance, as in the case of carbon composition resistors, films with appreciably higher resistivities are feasible.

Figure 1:
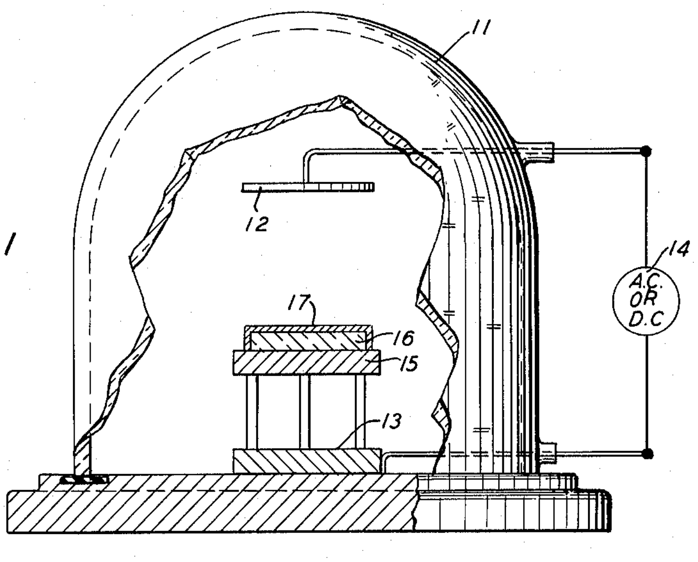
Figure 2:
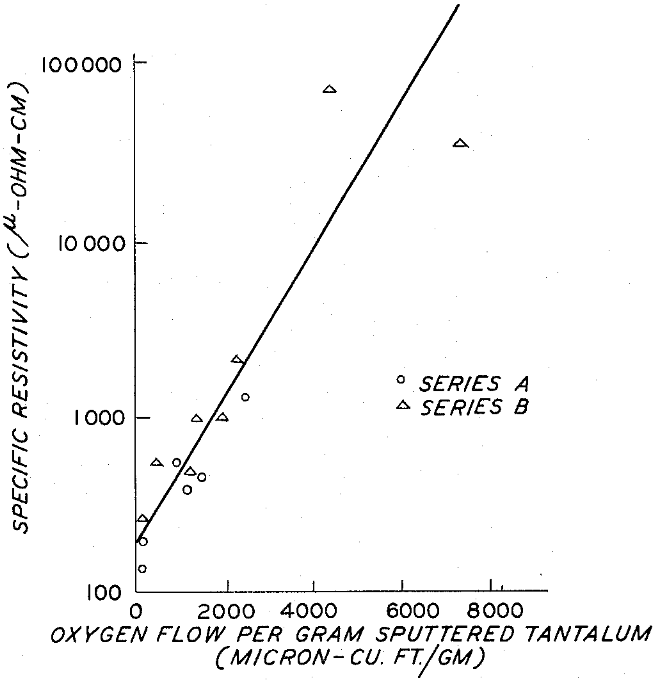
Figure 3:
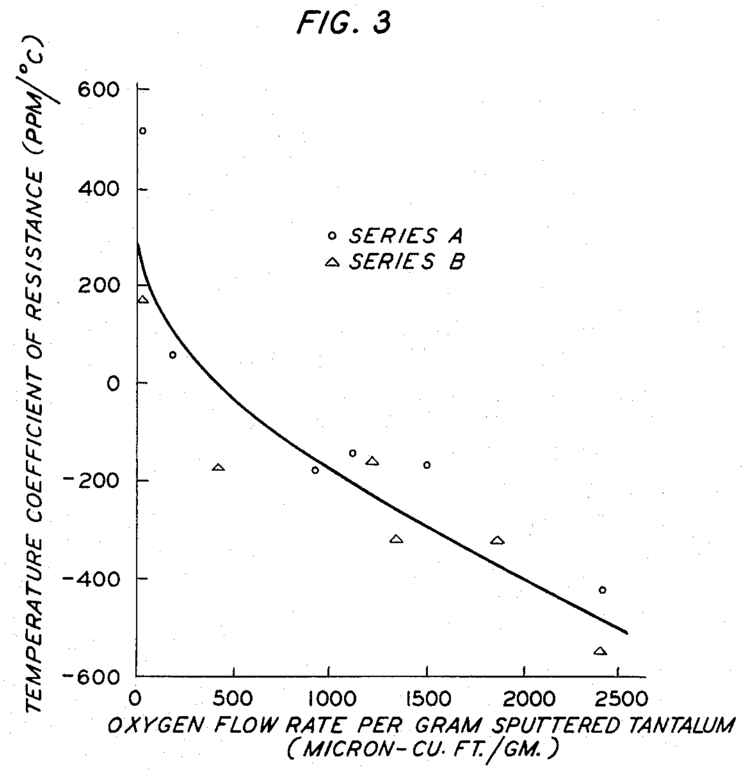
Figure 4:
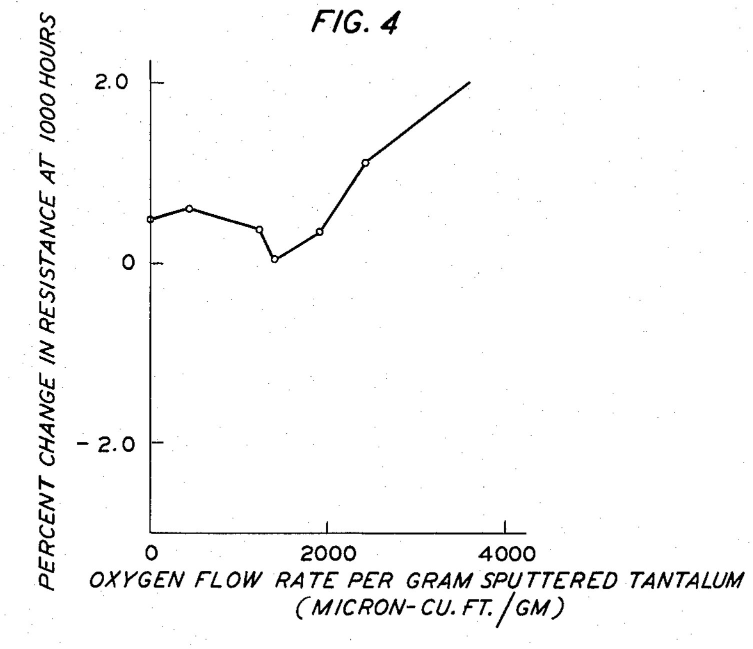

The invention will be more readily understood from the following detailed description taken in conjunction with the accompanying drawing in which:

FIG. 1 is a front elevational view, partly in section, of an apparatus suitable for use in producing a film of tantalum by reactive sputtering in accordance with the present invention;

FIG. 2 is a graphical representation on coordinates of specific resistivity in micro ohm-cm. against the oxygen flow rate per gram sputtered tantalum (measured in micron cubic feet per gram) showing the variations of resistivity at 25° C. of 500 A. tantalum films sputtered with varying oxygen flow rates with a total argon plus oxygen pressure of 20 to $25 \times 10^{-3}$ torr with subsequent anodization at 25 volts and thermal preaging in air at 250° C. for 5 hours;

FIG. 3 is a graphical representation on coordinates of temperature coefficient of resistance in parts per million per degree centigrade against the oxygen flow rate per gram sputtered tantalum measured in micron cubic feet per gram showing variations in temperature coefficient of resistance at 25° C. of 500 A. tantalum films sputtered with varying oxygen flow rates with a total argon pressure of 20 to $25 \times 10^{-3}$ torr with subsequent anodization at 25 volts and thermal preaging in air at 250° C. for 5 hours; and FIG. 4 is a graphical representation on coordinates of change in resistance (percent) at 1000 hours against the oxygen flow rate per gram sputtered tantalum showing variations in resistance after 1000 hours at 150° C. of resistors prepared in accordance with the present invention.

With reference more particularly to FIG. 1, there is shown an apparatus suitable for depositing tantalum films by reactive sputtering. Shown in FIG. 1 is a vacuum chamber 11 in which are disposed cathode 12 and anode 13. Cathode 12 may be composed of tantalum or, alternatively, may serve as the base for the tantalum which latter may be in the form of a coating, foil or other suitable physical form.

A source of electrical potential 14 is shown connected between cathode 12 and anode 13. Platform 15 is employed as a positioning support for substrate 16 upon which the sputtered film is to be deposited. Mask 17 is placed on substrate 16 to restrict the deposition to this area.

The present invention is conveniently described in detail by reference to an illustrative example in which tantalum is employed as cathode 12 in the apparatus shown in FIG. 1.

Preferred substrate materials for this invention are glasses, glazed ceramics, et cetera. These materials meet the requirements of heat resistance and nonconductivity essential for substrates utilized in reactive sputtering techniques.

Substrate 16 is first vigorously cleaned. Conventional cleaning agents are suitable, the choice of a specific one being dependent upon the composition of the substrate itself. For example, where the substrate consists of glass, boiling in aqua regia or hydrogen peroxide is a convenient method for cleaning the surface.

Substrate 16 is placed upon platform 15, as shown in FIG. 1, and mask 17 is then suitably positioned. Platform 15 and mask 17 may be fabricated from any refractory material. However, it may be convenient to use a metal, such as aluminum, for ease in fabricating mask 17. To obtain sharply defined deposits, it is necessary to have mask 17 bearing against substrate 16 under externally applied pressure.

In order to obtain the desired properties and to maintain close control of the process, it is essential to initially evacuate the system to $10^{-6}$ torr, thereby assuring a sufficiently low level of background gas. Next, oxygen is admitted at a dynamic pressure and after attaining equilibrium, argon is admitted.

Increasing the inert gas pressure and thereby reducing the vacuum within chamber 11 increases the rate at which the tantalum being sputtered is removed from the cathode and thus increases the rate of deposition. The maximum pressure is usually dictated by power supply limitations since increasing the pressure also increases the current flow between cathode 13 and anode 12. A practical upper limit in this respect is $25 \times 10^{-3}$ torr for a sputtering voltage of 4000 volts although it may be varied depending upon the size of the cathode, sputtering rate, et cetera. The ultimate maximum pressure is that at which the sputtering can be reasonably continued within the prescribed tolerances. It follows, from the discussion above, that the minimum pressure is determined by the lowest deposition rate which can be economically tolerated. After the requisite pressure is attained, cathode 12 is made electrically negative with respect to anode 13.

The practical minimum voltage necessary to produce sputtering is about 2000 volts. Increasing the potential difference between anode 13 and cathode 12 has the same effect as increasing the pressure, that of increasing both the rate of deposition and the current flow. Accordingly, the maximum voltage is dictated by consideration of the same factors controlling the maximum pressure.

The spacing between anode and cathode is not critical. However, the minimum separation is that required to produce a glow discharge which must be present for sputtering to occur. Many dark striations are well known and have been given names, as, for example, Crooke's Dark Space (see Joos, "Theorettical Physics," Hafner, New York, 1950, page 435 et seq.). For the best efficiency during the sputtering step, substrate 16 should be positioned immediately without Crooke's Dark Space on the side closet to the anode 13. Location of substrate 16 closer to cathode 12 results in a metal deposit of poorer quality. Locating substrate 16 further from cathode 12 results in the impingement on the substrate by a smaller fraction of the total metal sputtered, thereby increasing the time necessary to produce a deposit of given thickness.

It should be noted that the location of Crooke's Dark Space changes with variations in the pressure, it moving closer to the cathode with increasing pressure. As the substrate is moved closer to the cathode it tends to act as an obstacle in the path of gas ions which are bombarding the cathode. Accordingly, the pressure should be maintained sufficiently low so that Crooke's Dark Space is located beyond the point at which a substrate would cause shielding of the cathode.

The balancing of these various factors of voltage, pressure, and relative positions of the cathode, anode and substrate to obtain a high quality deposit is well known in the sputtering art.

With reference now more particularly to the example under discussion, by employing a proper voltage, pressure and spacing of the various elements within the vacuum chamber, an amorphous layer of tantalum and tantalum pentoxide is deposited in a configuration determined by mask 17. The sputtering is conducted for a period of time calculated to produce the desired thickness.

For the purposes of this invention, the minimum thickness of the layer deposited upon the substrate is approximately 400 Angstroms. There is no maximum limit on this thickness although little advantage is gained by an increase beyond 2000 Angstroms.

FIG. 2 is a graphical representation showing the specific resistivity in micro ohm–cm. at 25° C. of tantalum films which are approximately 500 Angstroms thick sputtered with a total pressure approximately $25\times10^{-3}$ torr of argon plotted as a function of the flow rate of oxygen per gram of sputtered tantalum. Each of the films so prepared was anodized at 25 volts and thermally preaged in air at 250° C. for 5 hours subsequent to sputtering. The films in series A were sputtered using a 25 liter/second diffusion pump while those in series B were sputtered using a 300 liter/second diffusion pump.

As is noted from the graph, it is possible to obtain tantalum resistors having specific resistivities ranging from at least 250 micro ohm-cm. to values of the order of 100,000 micro ohm-cm., such properties not being heretofore attained in thin film tantalum resistors.

An analysis of FIG. 3 which shows the temperature coefficient plotted against flow rate of oxygen per gram of sputtered tantalum for the same group of resistors as represented by the data in FIG. 2 indicates that the rise in resistivity, above anticipated values, is accompanied by a decrease in the temperature coefficient of resistivity to values within the range of −200 to −600 p.p.m./° C.

The use of oxygen flow rates measured in micron cubic feet per gram of sputtered tantalum within the range of 100–10,000 result in resistivities and temperature coefficients within the desired ranges. Although satisfactory resistors may be obtained when utilizing flow rates less than 100 micron cubic feet per gram a lower limit has been set for practical purposes. The upper limit of 10,000 micron cubic feet per gram is likewise not absolute and flow rates appreciably beyond this level may be employed without causing any deleterious results.

In FIG. 4 there is shown a graphical representation of life test data obtained for the series B resistors which were maintained at 150° C. for 1000 hours. The thermal life test data indicates that enhanced stability is obtained at increasing oxygen flow rates with the trend reversing slightly at flow rates of the order of 4000 micron cubic feet per gram. For the purpose of the present invention, pure oxygen (having a purity of 99.99+ percent) is required.

With reference once again to the example under discussion, the substrate is maintained at temperatures within the range of 100 to 400° C. during the reactive sputtering process. Temperatures below 100° C. result in poor adherence of the film to the substrate due to outgassing of the substrate, whereas temperatures appreciably beyond 400° C. adversely affect stability.

Following the deposition technique, the resultant film which is comprised of an amorphous mixture of tantalum and tantalum pentoxide is anodized for the purpose of adjusting the value of resistance to a desired level, such technique being disclosed in copending application, Serial No. 845,754 filed Oct. 12, 1959, now Patent No. 3,148,-129, in the names of H. Basseches, P. L. McGeough and D. A. McLean, said application being incorporated herein.

Next, the anodized films are heated in the presence of air at temperatures within the range of 250–400° C. for a time period within the range of 1 to 5 hours, thereby stabilizing said films.

An example of the present invention is described in detail below. This example and the illustration described above are included merely to aid in the understanding of the invention, and variations may be made by one skilled in the art without departing from the spirit and scope of the invention.

*Example*

This example describes the fabrication of a tantalum resistor in accordance with the present inventive technique.

A sputtering apparatus similar to that shown in FIG. 1 was used to produce an amorphous film of tantalum and tantalum pentoxide. The cathode consisted of a circular tantalum disk 250 mils thick and 5 inches in diameter with less than 100 p.p.m. interstitial impurities. In the apparatus actually employed, the anode was grounded, the potential difference being obtained by making the cathode negative with respect to ground.

A glass microscope slide, approximately ½ inch in width and 3 inches in length was used as a substrate. Gold terminals, ⅜ inch by ¼ inch were silk screened on each longitudinal side of the substrate. The gold terminals were fired at 500° C. and had a final resistance of approximately 0.1 ohm per square. The terminated slides were then cleaned using the following procedure. The slides were first washed in a detergent, such as "Alconox" to remove large particles of dirt and grease, and vigorously washed in tap water for several minutes, followed by a distilled water rinse.

The vacuum chamber was evacuated by means of a roughing pump and an oil diffusion pump to a pressure of approximately $1\times10^{-6}$ torr of mercury after a time period within the range of 1 to 2 hours. Next, the substrate was heated to a temperature of approximately 400° C. After obtaining such temperature, oxygen was admitted into the chamber at a dynamic pressure and after obtaining equilibrium argon was admitted into the chamber at a pressure of $25\times10^{-3}$ torr. During the sputtering reaction the flow rate of the oxygen was maintained at approximately 1500 micron cubic feet per gram of sputtered tantalum.

The anode and cathode were spaced approximately 2½ inches apart, the clean substrate being placed therebetween at a position immediately without Crooke's Dark Space. The substrate was maintained at a temperature of 400° C. during the sputtering reaction and a D.-C. voltage of 4000 volts was impressed between the cathode and anode. In order to establish equilibrium when first initiating the sputtering, it was found helpful to sputter on a shield for 30 minutes, thereby assuring reproducible results. Sputtering was conducted for approximately 5 minutes, producing a layer of 500 Angstroms of an amorphous film of tantalum and tantalum pentoxide. Electrical measurements were made at each stage of treatment of the resistor.

Next, the sputtered film was anodized at 25 volts D.-C. utilizing an electrolyte consisting of an aqueous nitric acid solution, .05 percent by weight. The anodized resistor was then thermally preaged by heating in air at 250° C. for 5 hours.

While the invention has been described in detail in the foregoing specification and the drawing similarly illustrates the same, the aforesaid is by way of illustration only and is not restrictive in character. The several modifications which will readily suggest themselves to persons skilled in the art are all considered within the scope of this invention, reference being had to the appended claims.

What is claimed is:

1. A method for the fabrication of a tantalum film resistor which comprises the steps of depositing said film on a substrate by reactively sputtering tantalum in an oxygen atmosphere in which the oxygen flow rate is maintained with in the range of 100 to 10,000 micron cubic feet per gram of sputtered tantalum, until the said film has a thickness of at least 400 Angstroms anodizing to increase the resistance and heating said anodized film in air at a temperature within the range of 250–400° C. for a time period of 1 to 5 hours.

2. The method of claim 1 wherein said substrate is maintained at a temperature within the range of 100–400° C. during the sputtering reaction.

3. The method of claim 1 wherein the oxygen flow rate is at least 1500 micron cubic feet per gram of sputtered tantalum.

4. Resistor produced in accordance with the method of claim 1.

References Cited by the Examiner

UNITED STATES PATENTS 3,148,129 9/1964 Basseches et al. -------- 204—38

OTHER REFERENCES

Belser and Hicklin: Journal of Applied Physics, vol. 30, No. 3, March 1959, pages 313–322.

WINSTON A. DOUGLAS, *Primary Examiner.*

R. K. MIHALEK, *Assistant Examiner.*